US012700228B2

(12) United States Patent
Yoffe et al.

(10) Patent No.: US 12,700,228 B2
(45) Date of Patent: Aug. 4, 2026

(54) METHOD OF CONFIGURING A PLATFORM FOR REMOTE SUPPORT SOLUTION USING IMAGE ANALYSIS

(71) Applicant: TECHSEE AUGMENTED VISION LTD., Herzliya (IL)

(72) Inventors: Amir Yoffe, Tel Mond (IL); Eitan Cohen, Tel Aviv (IL)

(73) Assignee: TECHSEE AUGMENTED VISION LTD., Herzliya (IL)

( * ) Notice: Subject to any disclaimer, the term of this patent is extended or adjusted under 35 U.S.C. 154(b) by 642 days.

(21) Appl. No.: 18/121,690

(22) Filed: Mar. 15, 2023

(65) Prior Publication Data

US 2023/0298338 A1 Sep. 21, 2023

Related U.S. Application Data

(60) Provisional application No. 63/320,780, filed on Mar. 17, 2022.

(51) Int. Cl.
*G06V 10/94* (2022.01)
*G06V 10/764* (2022.01)
*G06V 10/774* (2022.01)
*G06V 20/70* (2022.01)
*G06V 30/19* (2022.01)

(52) U.S. Cl.
CPC .......... *G06V 10/945* (2022.01); *G06V 10/764* (2022.01); *G06V 10/774* (2022.01); *G06V 20/70* (2022.01); *G06V 30/19147* (2022.01)

(58) Field of Classification Search
CPC ................. G06V 10/945; G06V 20/70; G06V 30/19147; G06V 10/774; G06V 10/764
See application file for complete search history.

(56) References Cited

U.S. PATENT DOCUMENTS

| | | | |
|---|---|---|---|
| 10,567,584 B2 | 2/2020 | Amir et al. | |
| 2017/0090717 A1* | 3/2017 | Chen | G06F 30/17 |
| 2018/0159979 A1* | 6/2018 | Amir | H04M 3/5183 |
| 2022/0270238 A1* | 8/2022 | Mc Donnell | G06V 20/52 |

FOREIGN PATENT DOCUMENTS

CN        110689037 A  *  1/2020  ............... G06N 3/08

* cited by examiner

*Primary Examiner* — Pinalben Patel
(74) *Attorney, Agent, or Firm* — The Roy Gross Law Firm, LLC; Roy D. Gross

(57) ABSTRACT

There is provided a system of training a deep learning model for support of a device in a remote technical support system, the system comprising a processing circuitry configured to: receive a plurality of images of a device to be supported; provide a user interface of annotating each image of the plurality of images, the annotating being data indicative of one or more of: one or more image identification labels, and one or more image subcomponent label tuples; and utilize, at least, the plurality of annotated images, to train a deep learning model to classify and/or segment an image to data indicative of at least one of: one or more image identification labels, and one or more image subcomponent label tuples, thereby providing a platform enabling automated creation of a remote support service.

9 Claims, 9 Drawing Sheets

---

Receive image/video data of a new end-user system that is to be supported
710

↓

Receive annotations (labels/segmentation) of image data
720

↓

Optionally: perform automatic annotation of related image data
730

↓

Generate synthetic image data for training
740

↓

Train DL model for classification (labels) and identification of subcomponents (segmentation) in images/video
750

↓

Install trained DL model on real-time server system
760

| First Label of Image (Image Class) 205 | | |
|---|---|---|
| Second Label of Image (specific image type) 210 | | |
| First Subcomponent Label 215A | First Subcomponent Status 220A | First Subcomponent Segmentation data (optional) 225A |
| nth Subcomponent Label 215n | nth Subcomponent Status 220n | nth Subcomponent Segmentation data (optional) 225n |

Frame 5

Frame 4

Frame 3

Frame 2

Frame 1

Fig. 7

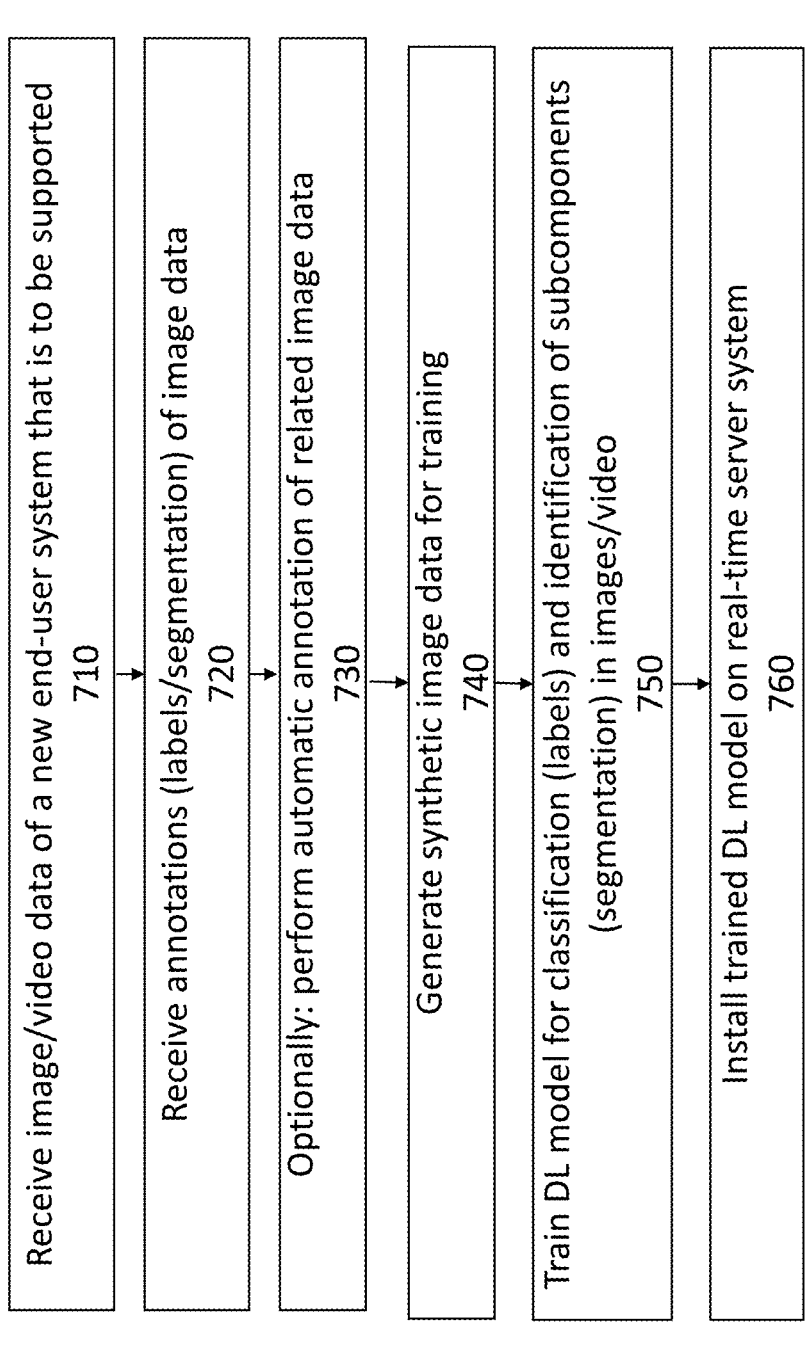

Receive image/video data of a new end-user system that is to be supported
710

Receive annotations (labels/segmentation) of image data
720

Optionally: perform automatic annotation of related image data
730

Generate synthetic image data for training
740

Train DL model for classification (labels) and identification of subcomponents (segmentation) in images/video
750

Install trained DL model on real-time server system
760

METHOD OF CONFIGURING A PLATFORM FOR REMOTE SUPPORT SOLUTION USING IMAGE ANALYSIS

CROSS REFERENCE TO RELATED APPLICATIONS

This application claims the benefit of priority of U.S. Provisional Patent Application No. 63/320,780 entitled "METHODS AND SYSTEMS FOR PROVIDING A PLATFORM FOR CREATING REMOTE SUPPORT SOLUTION USING IMAGE ANALYSIS" filed Mar. 17, 2022, the content of which is incorporated herein by reference in its entirety.

TECHNICAL FIELD

The presently disclosed subject matter relates to systems of using image processing to assist user with technical support, and in particular to configuration of such systems for support of new devices.

BACKGROUND

Technical support systems utilized nowadays make it difficult for digital service providers (DSPs), and especially for service/technical support centers, to provide efficient (in terms of time and customer satisfaction) technical support services to their customers. Despite a recent push toward self-service schemes, customer have been slow to adopt self-service technologies. Today's customers support model and relevant technologies are subject to the numerous challenges, including increasingly complex customer needs, communication gaps, diagnosis challenges, limited problem solving rates, and customer frustration.

Techniques disclosed in this disclosure aim to provide remote efficient consumer support services and reduce the incidence of technician dispatch. These techniques are useful for shortening consumer wait time, improving installation and repair outcomes, and improving customer satisfaction and independence.

GENERAL DESCRIPTION

According to one aspect of the presently disclosed subject matter there is provided a computer system of training a deep learning model for support of a device in a remote technical support system, the system comprising a processing circuitry configured to:

a) receive a plurality of images of a device to be supported;

b) provide a user interface of annotating each image of the plurality of images, the user interface being configured to, responsive to input from the user, assign annotation data to each respective image of the plurality of images, the annotation data being data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image, thereby giving rise to a plurality of annotated images; and c) utilize, at least, the plurality of annotated images, to train a deep learning model to classify and/or segment an image to data indicative of at least one of:

a. one or more image identification labels, and b. one or more image subcomponent label tuples;

thereby providing a platform enabling automated creation of a remote support service.

In addition to the above features, the method according to this aspect of the presently disclosed subject matter can comprise one or more of features (i) to (vii) listed below, in any desired combination or permutation which is technically possible:

(i) the processing circuitry is further configured to:

d) configure a network-based processing circuitry to utilize the trained deep learning model to classify a received image to data indicative of at least one of:

a. one or more image identification labels, and b. one or more image subcomponent label tuples.

(ii) the processing circuitry is configured to perform optical character recognition (OCR) on at least one image of the plurality of images, and to utilize data derivative of the performing the OCR to train the deep learning model (iii) the user interface is further configured to:

enable the user to modify the respective image or a subcomponent thereof, thereby giving rise to one or more synthetic images; and wherein the processing circuitry is further configured to utilize the synthetic images to train the deep learning model.

(iv) the user interface is further configured to:

enable the user to adjust a color of one or more device status indicators in the respective image, prior to the assigning the annotation data, thereby enabling utilization of training images representative of device status indicators in varied lighting environments, and giving rise to synthetic images improving training of the deep learning model for classification of device status indicators.

(v) the user interface is configured to enable the user to perform one or more modifications of the respective image that are selected from a group consisting of:

a) changing focus;

b) changing lighting;

c) changing contrast;

d) changing a background behind the supported device;

e) moving a device cable to a device cable attachment point;

f) rotating a position of a subcomponent; and g) overlaying or modifying image text.

(vi) the processing circuitry is further configured to, subsequent to the assigning, responsive to user input, of annotation data to a first image of the plurality of images:

track a displacement, in a second image, of one or more subcomponents that are annotated in the first image; and assign respective annotation data to the one or more subcomponents in the second image.

(vii) the second image is a frame of a video comprising the first image.

According to another aspect of the presently disclosed subject matter there is provided a processor-based method of training a deep learning model for support of a device in a remote technical support system, the method comprising:

a) receiving a plurality of images of a device to be supported;

b) providing a user interface of annotating each image of the plurality of images, the user interface being configured to, responsive to input from the user, assign annotation data to each respective image of the plurality of images, the annotation data being data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image, thereby giving rise to a plurality of annotated images; and c) utilizing, at least, the plurality of annotated images, to train a deep learning model to classify an image to data indicative of at least one of:

a. one or more image identification labels, and b. one or more image subcomponent label tuples;

thereby enabling automated creation of a remote support service.

This aspect of the disclosed subject matter can further optionally comprise one or more of features (i) to (vii) listed above with respect to the system, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of training a deep learning model for support of a device in a remote technical support system, the method comprising:

a) receiving a plurality of images of a device to be supported;

b) providing a user interface of annotating each image of the plurality of images, the user interface being configured to, responsive to input from the user, assign annotation data to each respective image of the plurality of images, the annotation data being data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image, thereby giving rise to a plurality of annotated images; and c) utilizing, at least, the plurality of annotated images, to train a deep learning model to classify an image to data indicative of at least one of:

a. one or more image identification labels, and b. one or more image subcomponent label tuples;

thereby enabling automated creation of a remote support service.

This aspect of the disclosed subject matter can further optionally comprise one or more of features (i) to (vii) listed above with respect to the system, mutatis mutandis, in any desired combination or permutation which is technically possible.

According to another aspect of the presently disclosed subject matter there is provided a computer system of training a deep learning model for support of a device in a remote technical support system, the system comprising a processing circuitry configured to:

a) receive a plurality of images of a device to be supported;

b) provide a user interface of annotating each image of the plurality of images, the user interface being configured to enable the user to adjust a color of one or more device status indicators in the respective image, thereby enabling utilization of training images representative of device status indicators in varied lighting environments, and giving rise to synthetic images improving training of the deep learning model for classification of device status indicators, the user interface being configured to, responsive to input from the user, assign annotation data to each respective image of the plurality of images, the annotation data being data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image, thereby giving rise to a plurality of annotated images; and c) utilize, at least, the plurality of annotated images, to train a deep learning model to classify an image to data indicative of at least one of:

a. one or more image identification labels, and b. one or more image subcomponent label tuples;

thereby providing a platform enabling automated creation of a remote support service.

This aspect of the disclosed subject matter can further optionally comprise one or more of features (i) to (vii) listed above with respect to the system, mutatis mutandis, in any desired combination or permutation which is technically possible.

According to another aspect of the presently disclosed subject matter there is provided a processor-based method of training a deep learning model for support of a device in a remote technical support system, the method comprising:

a) receiving a plurality of images of a device to be supported;

b) providing a user interface of annotating each image of the plurality of images, the user interface being configured to enable the user to adjust a color of one or more device status indicators in the respective image, thereby enabling utilization of training images representative of device status indicators in varied lighting environments, and giving rise to synthetic images improving training of the deep learning model for classification of device status indicators, the user interface being configured to, responsive to input from the user, assign annotation data to each respective image of the plurality of images, the annotation data being data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image, thereby giving rise to a plurality of annotated images; and c) utilizing, at least, the plurality of annotated images, to train a deep learning model to classify an image to data indicative of at least one of:

a. one or more image identification labels, and b. one or more image subcomponent label tuples;

thereby providing a platform enabling automated creation of a remote support service.

This aspect of the disclosed subject matter can further optionally comprise one or more of features (i) to (vii) listed above with respect to the system, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of training a deep learning model for support of a device in a remote technical support system, the method comprising:

a) receiving a plurality of images of a device to be supported;

b) providing a user interface of annotating each image of the plurality of images, the user interface being configured to enable the user to adjust a color of one or more device status indicators in the respective image, thereby enabling utilization of training images representative of device status indicators in varied lighting environments, and giving rise to synthetic images improving training of the deep learning model for classification of device status indicators, the user interface being configured to, responsive to input from the user, assign annotation data to each respective image of the plurality of images, the annotation data being data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image, thereby giving rise to a plurality of annotated images; and c) utilizing, at least, the plurality of annotated images, to train a deep learning model to classify an image to data indicative of at least one of:

a. one or more image identification labels, and b. one or more image subcomponent label tuples;

thereby providing a platform enabling automated creation of a remote support service.

This aspect of the disclosed subject matter can further optionally comprise one or more of features (i) to (vii) listed above with respect to the system, mutatis mutandis, in any desired combination or permutation which is technically possible.

According to another aspect of the presently disclosed subject matter there is provided a computer system of guiding use of a supported device, the system comprising a processing circuitry configured to:

a) receive, from a client, over a network: image data consisting or an image or a video;

iii) classify the received image data, using a deep learning model, resulting in annotation data, the annotation data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image; and c) transmit the annotation data, to the client, over the network, thereby enabling utilization, by remote applications, of deep learning-based analysis of images of supported devices.

According to another aspect of the presently disclosed subject matter there is provided a processor-based method of guiding use of a supported device, the method comprising:

a) receiving, from a client, over a network: image data consisting or an image or a video;

b) classifying the received image data, using a deep learning model, resulting in annotation data, the annotation data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image; and c) transmitting the annotation data, to the client, over the network.

According to another aspect of the presently disclosed subject matter there is provided a processor-based method of guiding use of a supported device, the method comprising:

a) receiving, from a client, over a network: image data consisting or an image or a video;

b) classifying the received image data, using a deep learning model, resulting in annotation data, the annotation data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image; and c) transmitting the annotation data, to the client, over the network.

According to another aspect of the presently disclosed subject matter there is provided a computer program product comprising a computer readable non-transitory storage medium containing program instructions, which program instructions when read by a processor, cause the processing circuitry to perform a method of guiding use of a supported device, the method comprising:

c) receiving, from a client, over a network: image data consisting or an image or a video;

d) classifying the received image data, using a deep learning model, resulting in annotation data, the annotation data indicative of one or more of:

iii) one or more image identification labels, and iv) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image; and c) transmitting the annotation data, to the client, over the network.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 1B illustrates an example data flow within a configuration of a remote customer support system, in accordance with some embodiments of the presently disclosed subject matter;

FIG. 2 illustrates an example structure of data flowing from a remote customer support system to a client, in accordance with some embodiments of the presently disclosed subject matter;

FIG. 7 is a flow diagram illustrating an example method training a deep learning model for utilization in a remote customer support system, in accordance with some embodiments of the presently disclosed subject matter.

DETAILED DESCRIPTION

Figure 1A:
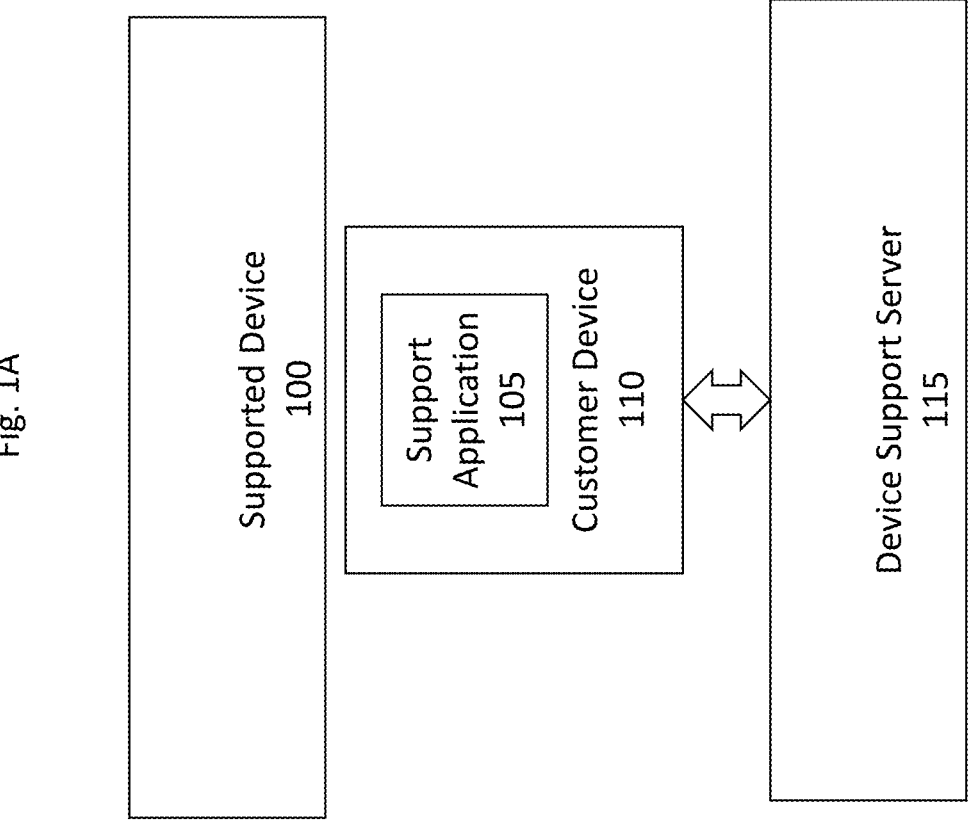
FIG. 1A illustrates an example configuration of a remote customer support system, in accordance with some embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "comparing", "determining", "calculating", "receiving", "providing", "obtaining", "detecting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor, mitigation unit, and inspection unit therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

U.S. Pat. No. 10,567,584 ("METHODS AND SYSTEMS FOR PROVIDING INTERACTIVE SUPPORT SESSION") describes a beneficial and powerful system for remote technical support of customer devices across a wide variety of scenarios.

However, setting up such a system for a particular supported device involves technical challenges. For example: training a deep learning model for a newly supported device—so that the device, its subcomponents, and its statuses can be correctly identified across wide variations in position, lighting, background, etc. that occurs in real-world deployment is a complex task. In some cases, multiple iterations are needed to train and verify correct operation of the deep learning model.

Some embodiments of the presently disclosed subject matter enable automated creation and training of deep learning models to be utilized in systems of remote technical support of customer devices.

Some such embodiments receive initial training data in the form of annotated images and/or video frames of a new customer device to be supported.

Some such embodiments then utilize methods including automatic annotation and synthetic image creation to augment the training data set, thereby enabling training of the deep learning model that is sufficient for the technical support application. Some such embodiments specifically create training images with variations in colors of device status indicators (e.g. light emitting diodes (LEDs)) to train the deep learning model to correctly classify device status indicators in various lighting conditions.

In some embodiments, following the training of the deep learning model, the training system can install the deep learning model to a system of remote technical support of customer devices (for example, in a cloud server).

In some embodiments, the server can expose a network interface (for example; using a interface method such as REST) that receives device images from a client (e.g. on a mobile device), and then returns annotated images to the client, thereby enabling updating of the deep learning model with continued interoperation with client systems.

FIG. 1A illustrates an example system of guiding use of a supported device, in accordance with some embodiments of the presently disclosed subject matter.

Supported device 100 can be a consumer device, or a device in an industrial facility etc. By way of non-limiting examples: Supported device 100 can be a home consumer electronics device such as a cable modem or digital subscriber line (DSL) modem, a kitchen appliance such as a blender or food processor, or other types of devices in different scenarios which require ongoing support for optimal use or configuration.

Device support server 115 can be a server device located e.g. at premises of a service provider, or as a server "in the cloud" that is maintained by a service provider at a data center. Device support server 115 can store data pertaining to use, configuration, troubleshooting or other functions of supported device 100.

Customer device 110 can be a general-purpose or specialized-purpose device used by customer who has a supported device on premises. Customer device 110 can be, for example, a smartphone, tablet computer, or laptop etc. In some embodiments, customer device 110 is a suitably positioned stationary device such as a desktop computer with a movable camera and/or microphone, or with a suitably positioned camera and/or microphone.

Support application 105 can be an application on customer device 110. In some embodiments, support application 105 is a mobile application that executes on customer device 110 which is a smartphone, and then utilizes the smartphone camera to capture images and/or video of supported device 100, transmits the captured images and/or video to device support server 115 via a wireless data connection (not shown). In some embodiments, support application 105 receives support data from device support server 115.

Examples details of device support server 115 and support application 105 are described in "METHODS AND SYSTEMS FOR PROVIDING INTERACTIVE SUPPORT SESSION" U.S. Pat. No. 10,567,584, which is hereby incorporated by reference.

Figure 1B:
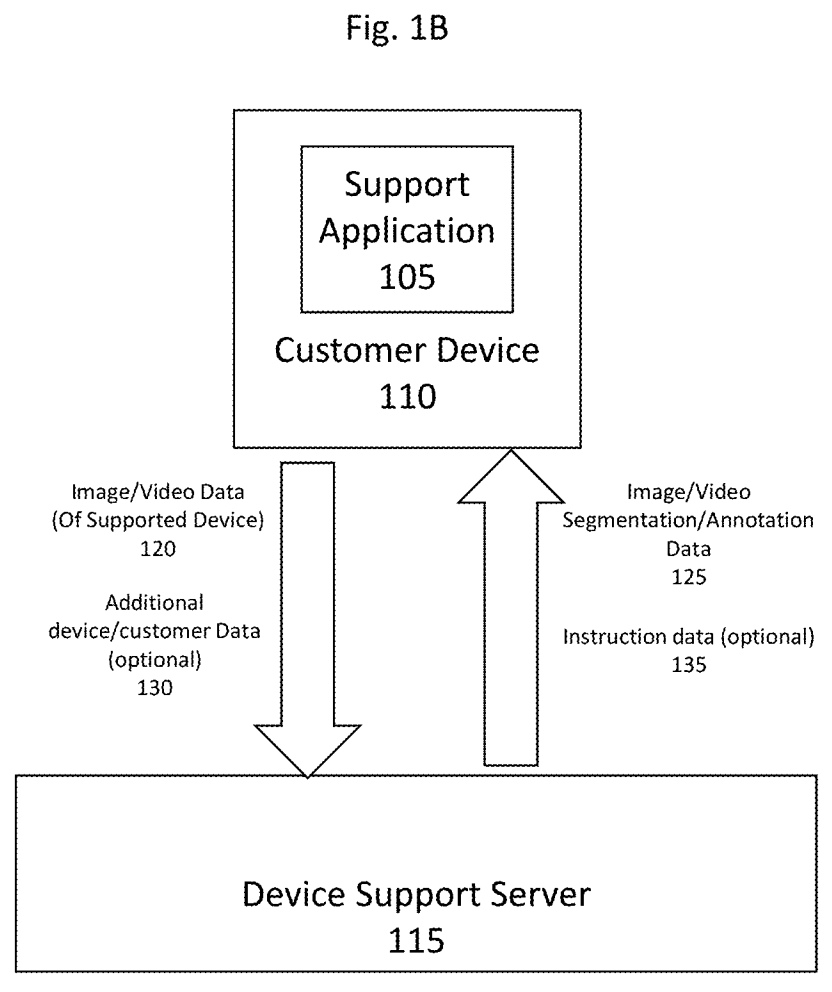

FIG. 1B illustrates an example data flow between support application 105 (executing on customer device 110) and device support server 115.

Support application 105 can transmit image/video data (depicting the supported device) 120. This data can be a live stream of image and/or video data that support application 105 generates e.g. when a customer directs a camera of customer device 110 at a supported device 100 which is e.g. not functioning as desired.

Support application 105 can optionally transmit additional/device customer data 130. This data can include—for example—audio or text data provided by a customer that is indicative of what he or she regards the problem to be. This data can also include intent analysis data i.e., keywords derived by support application 105 from such audio or text data provided by the customer. In some embodiments, this data includes other information such as room temperature.

Device Support Server 115 can transmit data to support application 105. Transmitted data can include image/video segmentation/annotation data 125. This data can include:

Labels that apply to the entire image (such as descriptions of what is depicted)

Labels that apply to subcomponents of the image (such as labels of subcomponents e.g. status indicator lights, status associated with these subcomponents, and image segmentation data associated with these subcomponents.

Support application 105 can then display the images/video with annotations and segmentation (so that support application 105 shows images or video after a delay required to transmit to device support server 115 and receive annotation. Alternatively, in some embodiments, support application 105 utilizes received annotation data to perform annotation of newly captured image or video.

In some embodiments, device support server 115 additionally transmits instruction data (optional) 135 to the support application. This data can include text instructions regarding operations that the customer should perform to resolve his or her problem with supported device 100.

It is noted that the teachings of the presently disclosed subject matter are not bound by the system described with reference to FIGS. 1A-1B. Equivalent and/or modified functionality can be consolidated or divided in another manner and can be implemented in any appropriate combination of software with firmware and/or hardware and executed on a suitable device. Customer device 110, support application 105, and device support server 115 can be a standalone entities, or integrated, fully or partly, with other entities.

FIG. 2 illustrates an example data structure of transporting annotation/segmentation data (pertinent to a particular image) from device support server 115 to support application 105 (executing on customer device 110). It is recalled that—in some embodiments—device support server 115 receives images and/or video of supported device 100, performs annotation and segmentation on these, and then transmits annotation/segmentation data to support application 105.

The annotation/segmentation data pertaining to an image or a frame of a video can include, for example, a first label of the image 205. This can be a label that applies to the image as a whole. In some embodiments, first label of the image 205 can denote an "image class" (e.g. "DSL modem", "blender", etc.).

The annotation/segmentation data can further include, for example, a second label of the image 210. This label also can be a label that applies to the image as a whole. In some embodiments, second label of the image 210 can denote an specific image type (e.g. a specific device model of a DSL modem or blender).

It will be understood that—in other embodiments—annotation/segmentation data can carry zero, one, two or more instances of labels that apply to the image as a whole.

The annotation/segmentation data can further include, for example, subcomponent tuples which include data pertinent to a particular segment or feature within an image or video frame. Each subcomponent tuple can include:

subcomponent label 215A 215n: this can be a label that applies to a particular subcomponent of the pertinent image. For example, the subcomponent can be a power indicator LED, and the label can be "power indicator LED".

subcomponent status 220A 220n: this can be data (such a character string or a constant value) that is indicative of a relevant status of a labeled subcomponent. For example: subcomponent status 220A for a "power indicator LED" might be 0 for "off" and 1 for "on". Alternatively, the subcomponent status 220A could be "green", "yellow", "red" etc.

subcomponent segmentation data 225A 225*n*: this can be data indicative of the position of the subcomponent in the image, given in a suitable manner. For example: segmentation data can be given as pixel coordinates of the centerpoint of the subcomponent in the image, accompanied by a pixel height and pixel width, thereby defining a rectangle enclosing the subcomponent.

Figure 3:
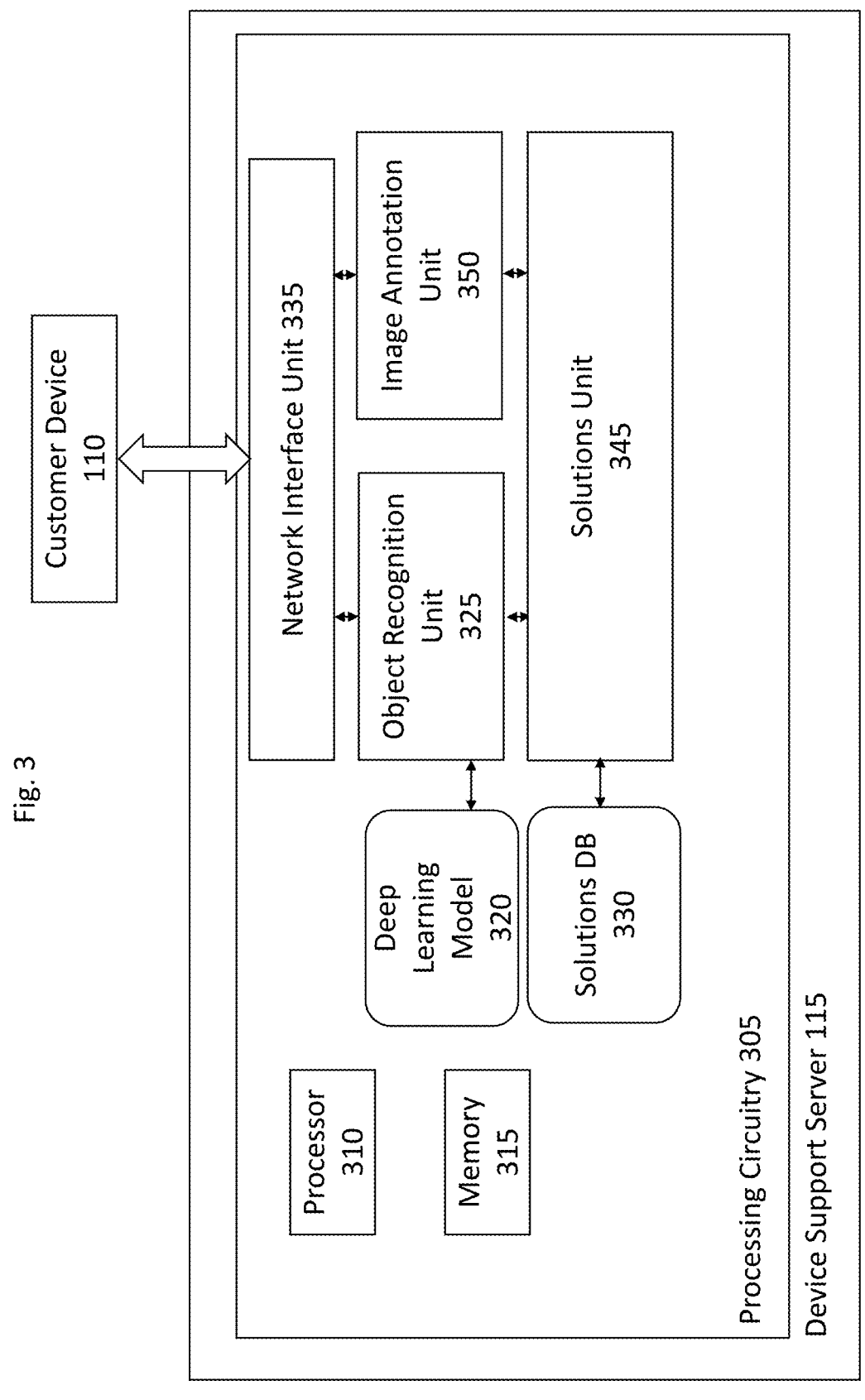
FIG. 3 illustrates a logical component diagram of an example remote customer support system, in accordance with some embodiments of the presently disclosed subject matter.

FIG. 3 illustrates logical component diagram of an example device support server.

Detailed examples of components and methods of device support servers are described in "METHODS AND SYSTEMS FOR PROVIDING INTERACTIVE SUPPORT SESSION" U.S. Pat. No. 10,567,584, as noted hereinabove.

Network interface unit 335 can communicate with customer device 110 via REST or another suitable communication method, thereby enabling utilization, by remote applications, of deep learning-based analysis of images of supported devices.

Object recognition unit 325 can utilize deep learning model 320 to recognize objects in the image, resulting e.g. in annotation data for the image. In some embodiments, optical character recognition can be utilized for object recognition.

Solutions unit 345 can receive annotation data or other object data from object recognition unit 325. Solutions unit 345 can use the received data (possibly in conjunction with intent analysis or other additional data) to look up a solution in solutions database 330.

Image annotation unit 350 can utilize annotation data and/or solutions data, and can transmit instructions to the customer device 110.

It is noted that in some embodiments device support server 115 can be located in a cloud server. It is noted that in some other embodiments, device support server 115 can be collocated in customer device 110.

It is noted that the teachings of the presently disclosed subject matter are not bound by the system described with reference to FIG. 3. Equivalent and/or modified functionality can be consolidated or divided in another manner and can be implemented in any appropriate combination of software with firmware and/or hardware and executed on a suitable device. Provider SaaS platform 400 can be a standalone entity, or integrated, fully or partly, with other entities.

Figure 4:
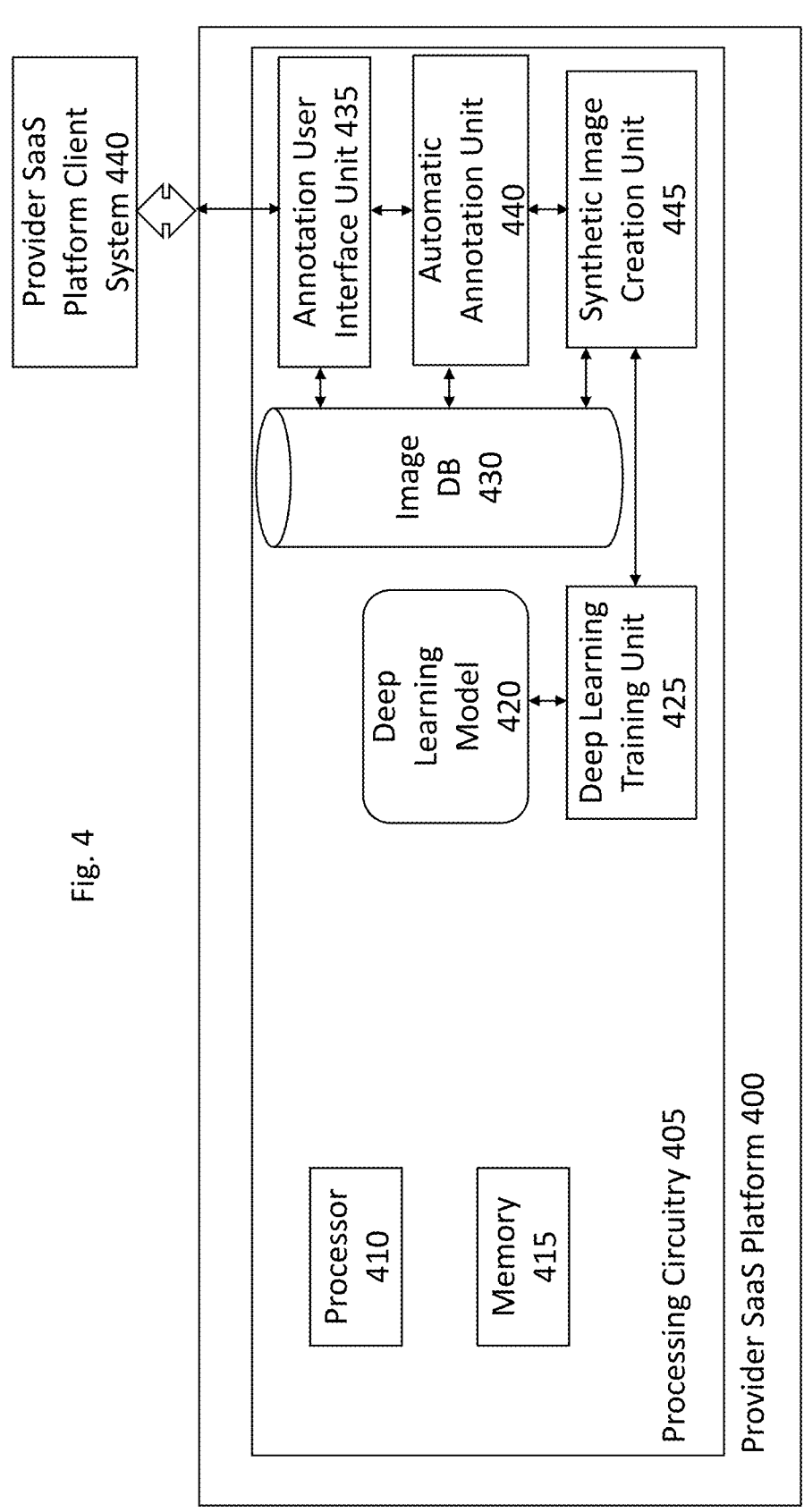
FIG. 4 illustrates a logical component diagram of an example platform of training a deep learning model for use in remote customer support system, in accordance with some embodiments of the presently disclosed subject matter.

FIG. 4 illustrates logical component diagram of an example system of configure a device support server to support a new device.

In some embodiments, the system is implemented as a software-as-a-service (SaaS) platform providing a web-based user interface to a person (herein termed the annotator) who can manage the process of configuring a device support server to support a new device and can provide non-automated functions such as some image labeling. In some embodiments, the system is implemented as a different (e.g. non-SaaS) type of suitable platform, or with a different (e.g. non-web) suitable type of user interface.

More specifically, Provider SaaS Platform 400 can receive initial images of a new supported device 100, can receive annotation and segmentation data, can automatically perform annotation/segmentation of additional image data, can create synthetic training data, can training a deep learning model with the training data, and can install the deep learning model on a device support server 115.

Provider SaaS platform client system 440 can be a computer, laptop, tablet etc. It can be utilized by e.g. the annotator.

Provider SaaS Platform 400 can include processing circuitry 405, which can include processor 410 and memory 415.

Processor 410 can be a suitable hardware-based electronic device with data processing capabilities, such as, for example, a general purpose processor, digital signal processor (DSP), a specialized Application Specific Integrated Circuit (ASIC), one or more cores in a multicore processor, etc. Processor 410 can also consist, for example, of multiple processors, multiple ASICs, virtual processors, combinations thereof etc.

Memory 415 can be, for example, a suitable kind of volatile and/or non-volatile storage, and can include, for example, a single physical memory component or a plurality of physical memory components. Memory 415 can also include virtual memory. Memory 415 can be configured to, for example, store various data used in computation.

Processing circuitry 405 can be configured to execute several functional modules in accordance with computer-readable instructions implemented on a non-transitory computer-readable storage medium. Such functional modules are referred to hereinafter as comprised in the processing circuitry. These modules can include, for example, annotation user interface unit 435, automatic annotation unit 440, synthetic image creation unit 445, image database 430, deep learning training unit 425, and deep learning model 420.

Annotation user interface unit 435 can be a functional module which interacts with provider SaaS platform client system 440 and the annotator to obtain annotation (e.g. labeling and segmentation) data.

Annotation user interface unit 435 can receive unannotated images of a new device that is to be supported—for example: from image database 430.

Annotation user interface unit 435 can present unannotated images to the annotator to obtain annotation information. An example user interface screen provided to the annotator by annotation user interface unit 435 is described below with reference to FIG. 5A. Annotation user interface unit 435 can store automatically annotated image data to image database 430.

Automatic annotation unit 440 can receive annotated image data from image DB 430 and utilize the annotation information to annotate other images (such as subsequent frames of a video, or subsequent images captured within a particular time frame, or subsequent images that are sufficiently similar to an annotated image). Automatic annotation is further described below, with reference to FIG. 6. Automatic annotation unit 440 can store automatically annotated image data to image database 430.

Synthetic image creation unit 445 can receive annotated image data from image DB 430 and generate synthetic images so as to train deep learning model 420. An example user interface screen provided to the annotator by annotation user interface unit 435 for control of synthetic image creation is described below with reference to FIG. 5B.

In some embodiments, the presently disclosed subject matter addresses training a machine learning model to identify statuses or error conditions on electronic devices utilizing status indicators (e.g. based on light-emitting diodes (LEDs) or the like.

In some examples, LED color in captured images may appear different under various environment and camera conditions: a green LED may in some circumstances be appear as dark green and in other circumstances may appears as a light green that is actually very close to yellow.

In some embodiments of the presently disclosed subject matter, processing circuitry 405 (e.g. annotation user interface unit 435) can provide an interface enabling a user to select LED colors an apply them to images, so as to train the deep learning model to correctly classify device images that include LEDs.

In some examples, synthetic image creation unit 445 generates synthetic image data for training by modifying the image in one or more of the following manners:

changing focus
changing lighting
changing contrast;
changing a background behind the supported device
moving a device cable to a device cable attachment point
rotating a position of a subcomponent
overlaying or modifying image text Synthetic image creation unit 445 can store synthetic images to image database 430.

Deep learning training unit 425 can perform training of deep learning model 420 in a model-specific fashion using the training images in image database 430 and using training methods that are known in the art. Subsequent to training, deep learning model 420 is sufficiently trained and can be installed in a device server 115.

It is noted that the teachings of the presently disclosed subject matter are not bound by the system described with reference to FIG. 4. Equivalent and/or modified functionality can be consolidated or divided in another manner and can be implemented in any appropriate combination of software with firmware and/or hardware and executed on a suitable device. Provider Saas Platform 400 can be a standalone entity, or integrated, fully or partly, with other entities.

Figure 5A:
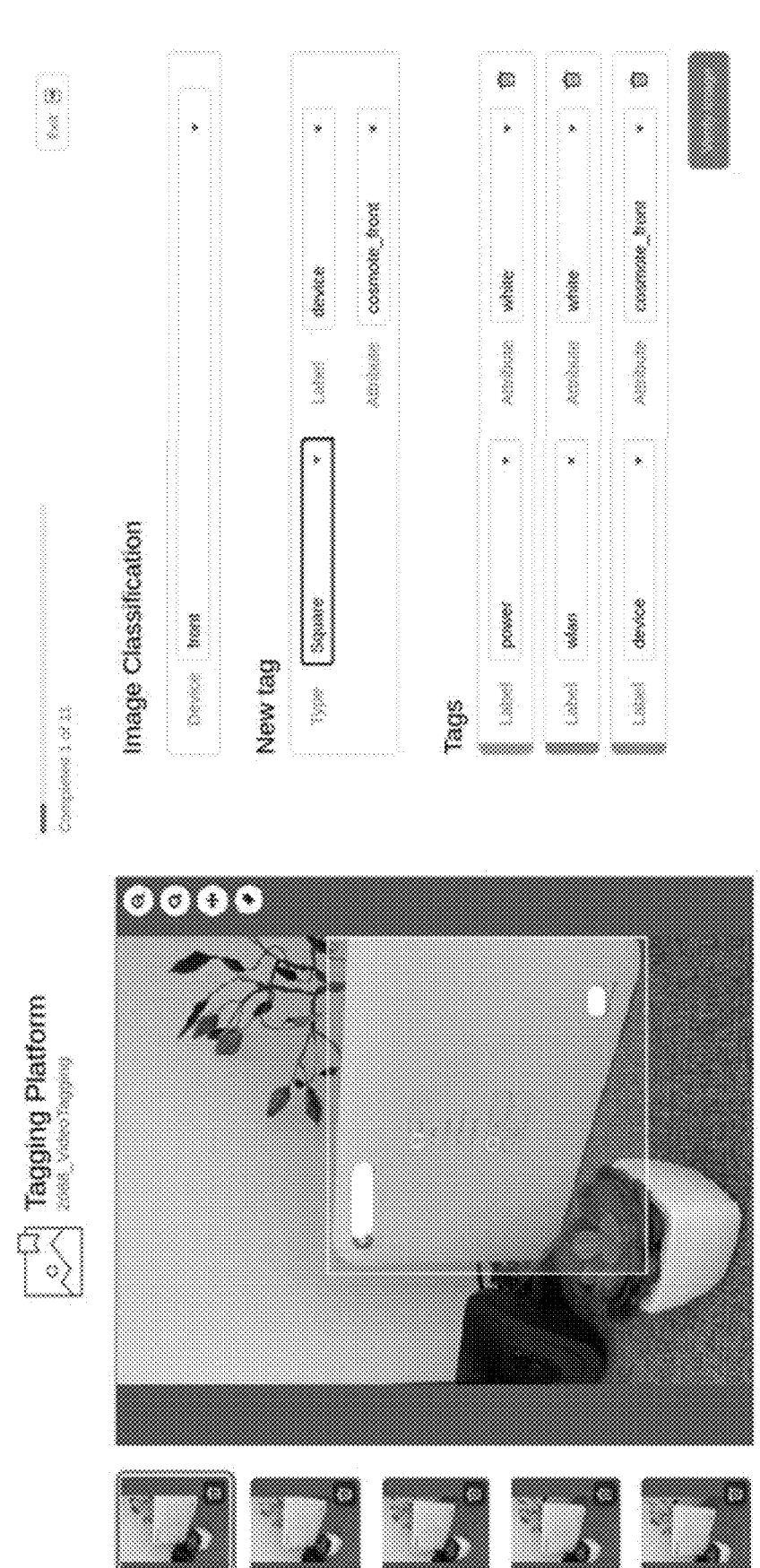
FIG. 5A illustrates an example user interface screen for applying labels to training images in a platform of training a deep learning model for use in remote customer support system, in accordance with some embodiments of the presently disclosed subject matter.

FIG. 5A illustrates an example user interface to enable a human annotator to provide labels and segmentation of an image of a new supported device 100.

This example interface provides:

A tool for assigning label data to the image as a whole ("image classification")
An interface tool for selecting a particular rectangular portion of the image
A subcomponent tagging menu for assigning a subcomponent label and status (here termed "attribute). For example: the "power" led has been assigned the status of "white"

Figure 5B:
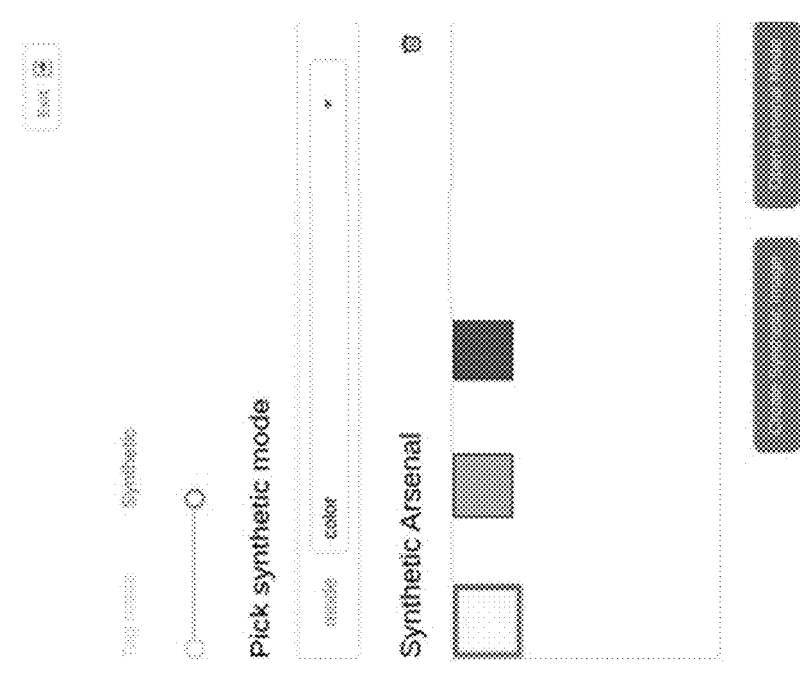
FIG. 5B illustrates an example user interface screen for specifying characteristics of synthetic training images in a platform of training a deep learning model for use in remote customer support system, in accordance with some embodiments of the presently disclosed subject matter.
Figure 5B:
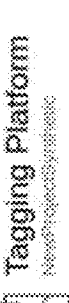
Figure 5B:
Figure 5B:
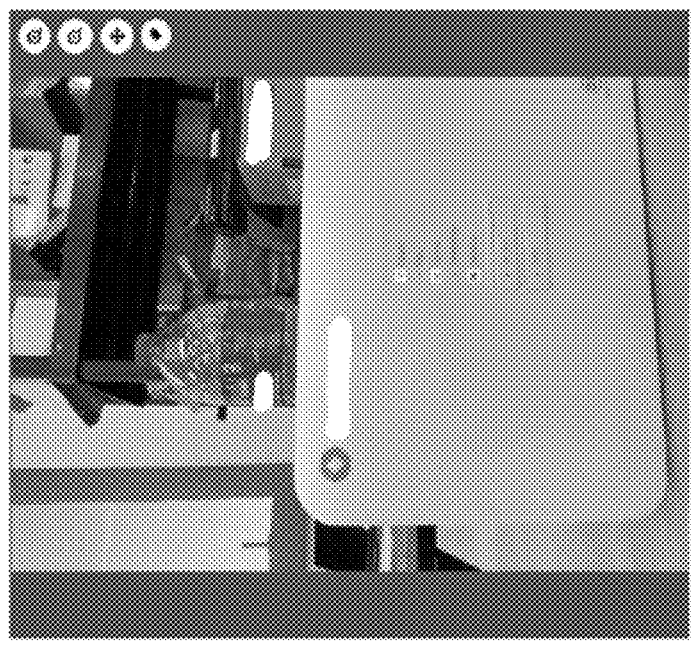
Figure 5B:
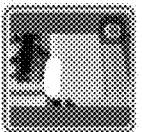

FIG. 5B illustrates an example user interface to enable a human annotator to specify creation of synthetic images for training.

In this example, "mode" is set to "color", and an arsenal of colors to be utilized is presented for selection by the annotator. In some embodiments, the "arsenal" that is presented represents different indicator colors that correspond to different lighting conditions (e.g. "green LED in bright light", "green LED in dim light", "red LED in bright light", "red LED in dim light" etc.).

In other modes, blur, lighting, and other aspects of the image can be manipulated, as described above.

Figure 6:
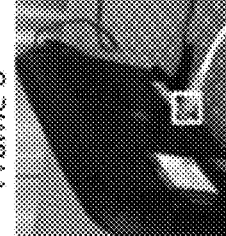
FIG. 6 is a series of example device images to which automatic annotation has been applied, in accordance with some embodiments of the presently disclosed subject matter.
Figure 6:
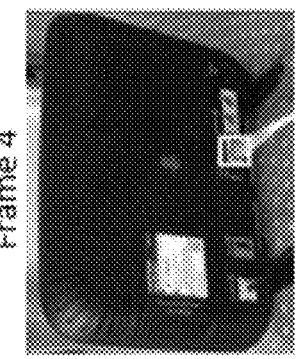
Figure 6:
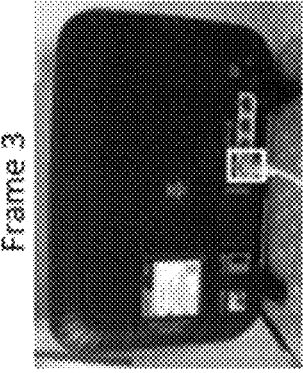
Figure 6:
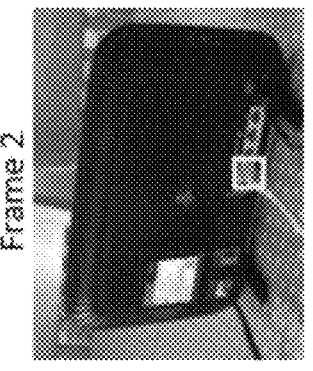
Figure 6:
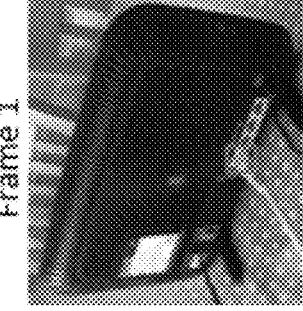

FIG. 6 illustrates an example sequence of images illustrating application of automatic annotation.

To train the deep learning model for effective classification and segmentation of customer-generated images for troubleshooting, it can be necessary to increase the number of images in the training set, and to ensure variety and heterogeneity of images across various parameters.

In some embodiments of the presently disclosed subject matter, provider SaaS platform 400 can receive video of the device to be supported (e.g. from a moving camera panning the device from different angles), and generate multiple training images as described hereinbelow.

The particular example illustrated in FIG. 6 is a sequence of frames from a video.

In the sequence of FIG. 6, the first frame was annotated manually (dark box). Provider Saas platform 400 then tracked the annotated subcomponent along its movement within the subsequent images. Provider Saas platform 400 can then annotate each frame automatically (the white boxes in the subsequent image) generating a large volume of images that can then be utilized to train the deep learning module.

FIG. 7 illustrates a flow diagram of an example method of configuring a processing circuitry of guiding use of a supported device, in accordance with some embodiments of the presently disclosed subject matter.

Processing circuitry 405 (e.g. image DB 430) can first receive 710 image/video data of a new end-user system that is to be supported. Images and/or video of a new device that is to receive technical support from a device support server 115 can—for example—be uploaded to provider SaaS platform 400 via an upload facility or by some other mechanism, and these images and/or video can be stored—for example—in image DB 430.

Processing circuitry 405 (e.g. annotation user interface unit 435) can next receive 720 annotations (for example: labels and segmentation) of image data (i.e. images and/or video). By way of non-limiting example, processing circuitry 405 (e.g. annotation user interface unit 435) can present a human user with an interface such as the one described above with reference to FIGS. 5A-5B.

In some embodiments, processing circuitry 405 (e.g. annotation user interface unit 435) can perform optical character recognition (OCR) on at least one image of the plurality of images, and to utilize annotation data that is derivative of (e.g. identical with) the detected text.

In some embodiments, processing circuitry 405 can utilize annotation data that is from a different source (e.g. data that is received from another device).

As a result of the annotation process, each image can have annotation data associated with it. In some embodiments, the resulting annotation data can include:

One or more image-level labels
One or more subcomponent tuples (e.g. a subcomponent label, a subcomponent status, and optionally subcomponent segmentation information)

Segmentation information can be data indicative of the position of the subcomponent in the image. More specifically, the segmentation information can be data that describes the position and size of a box or circle in the image.

Optionally: processing circuitry 405 (e.g. automatic annotation unit 440) can perform 730 automatic annotation of related images and/or video data.

By way of non-limiting example: when processing circuitry 405 (e.g. annotation user interface unit 435) has a received annotation data for a first frame of video sequence showing the new supported device from different angles, processing circuitry 405 (e.g. automatic annotation unit 440) can perform automatic annotation (for example: as described above with reference to FIG. 6) to assign annotation data to the remaining frames of the video.

In some other examples, processing circuitry 405 (e.g. automatic annotation unit 440) can similarly perform automatic annotation to annotate a sequence of still images that were captured with a particular capture interval rate (e.g. at a rate once per 0.5 seconds).

Processing circuitry 405 (e.g. synthetic image generation unit 445) can generate 740 synthetic image data for training.

In some embodiments, the presently disclosed subject matter addresses training a machine learning model to identify statuses or error conditions on electronic devices utilizing status indicators (e.g. based on light-emitting diodes (LEDs)) or the like.

In some examples, LED color in captured images may appear different under various environment and camera conditions: a green LED may in some circumstances be appear as dark green and in other circumstances may appears as a light green that is actually very close to yellow.

In some embodiments of the presently disclosed subject matter, processing circuitry 405 (e.g. annotation user interface unit 435) can provide an interface enabling a user to select LED colors an apply them to images, so as to train the deep learning model to correctly classify device images that include LEDs.

In some examples, processing circuitry 405 (e.g. synthetic image generation unit 445) generates 740 synthetic image data for training by modifying the image in on or more of the following manners:

changing focus changing lighting changing contrast;

changing a background behind the supported device moving a device cable to a device cable attachment point rotating a position of a subcomponent overlaying or modifying image text Processing circuitry 405 (e.g. deep learning training unit 425) can utilized then train 750 the deep learning model to classify (e.g. generate image-level labels, and subcomponent labels/statuses) and identification of subcomponents (i.e. determining segmentation data) in images/video. Model-appropriate training methods can be utilized, as known in the art.

Processing circuitry 405 (e.g. deep learning training unit 425) can then install 760 the trained deep learning model on a device support server 115 (e.g. via network connection (not shown)). Alternatively, the trained deep learning model can be installed on a device support server 115 via a different suitable mechanism.

It is noted that the teachings of the presently disclosed subject matter are not bound by the flow diagram illustrated in FIG. 7, and that in some cases the illustrated operations (for example, operations 730 and 740) may occur concurrently or out of the illustrated order. It is also noted that whilst the flow chart is described with reference to elements of the system of FIGS. 1A-1B and FIG. 4, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A system of training a deep learning model for support of a device in a remote technical support system, the system comprising:

a processing circuitry configured to:

a) receive a plurality of images of a device to be supported;

b) provide a user interface of annotating each image of the plurality of images, the user interface being configured to, responsive to input from the user, assign annotation data to each respective image of the plurality of images, the annotation data being data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image, thereby giving rise to a plurality of annotated images, and the user interface being further configured to enable the user to adjust a respective color of one or more device status indicators in the respective image, thereby enabling utilization of training images representative of device status indicators in varied lighting environments, and giving rise to synthetic images improving training of the deep learning model for classification of device status indicators; and c) utilize, at least, the plurality of annotated images, to train a deep learning model to classify and/or segment an image to data indicative of at least one of:

i) one or more image identification labels, and ii) one or more image subcomponent label tuples;

thereby providing a platform enabling automated creation of a remote support service.

2. The system of claim 1, wherein the processing circuitry is further configured to:

a) configure a network-based processing circuitry to utilize the trained deep learning model to classify a received image to data indicative of at least one of:

a. one or more image identification labels, and b. one or more image subcomponent label tuples.

3. The system of claim 1, wherein the processing circuitry is configured to perform optical character recognition (OCR) on at least one image of the plurality of images, and to utilize data derivative of the performing the OCR to train the deep learning model.

4. The system of claim 1, wherein the user interface is further configured to:

enable the user to modify the respective image or a subcomponent thereof, thereby giving rise to one or more synthetic images; and wherein the processing circuitry is further configured to utilize the synthetic images to train the deep learning model.

5. The system of claim 4, wherein the user interface is configured to enable the user to perform one or more modifications of the respective image that are selected from a group consisting of:

a) changing focus;

b) changing lighting;

c) changing contrast;

d) changing a background behind the supported device;

e) moving a device cable to a device cable attachment point;

f) rotating a position of a subcomponent; and g) overlaying or modifying image text.

6. The system of claim 1, wherein the processing circuitry is further configured to, subsequent to the assigning, responsive to user input, of annotation data to a first image of the plurality of images:

track a displacement, in a second image, of one or more subcomponents that are annotated in the first image; and assign respective annotation data to the one or more subcomponents in the second image.

7. The system of claim 6, wherein the second image is a frame of a video comprising the first image.

8. A processor-based method of training a deep learning model for support of a device in a remote technical support system, the method comprising:

a) receiving a plurality of images of a device to be supported;

b) providing a user interface of annotating each image of the plurality of images, the user interface, responsive to input from the user, assigning annotation data to each respective image of the plurality of images, the annotation data being data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image, thereby giving rise to a plurality of annotated images, and the user interface further enabling a user to adjust a respective color of one or more device status indicators in the respective image, thereby enabling utilization of training images representative of device status indicators in varied lighting environments, and giving rise to synthetic images improving training of the deep learning model for classification of device status indicators; and c) utilizing, at least, the plurality of annotated images, to train a deep learning model to classify an image to data indicative of at least one of:

a. one or more image identification labels, and b. one or more image subcomponent label tuples;

thereby enabling automated creation of a remote support service.

9. A computer program product comprising a computer readable non-transitory storage medium containing program instructions, which program instructions when read by a processor, cause the processing circuitry to perform a method training a deep learning model for support of a device in a remote technical support system, the method comprising:

a) receiving a plurality of images of a device to be supported;

b) providing a user interface of annotating each image of the plurality of images, the user interface, responsive to input from the user, assigning annotation data to each respective image of the plurality of images, the annotation data being data indicative of one or more of:

i) one or more image identification labels, and ii) one or more image subcomponent label tuples, wherein each subcomponent tuple comprises an identification label of a respective subcomponent of the respective image, and at least one of:

i. a status of the respective subcomponent, and ii. data indicative of a segmentation of the respective subcomponent in the respective image, thereby giving rise to a plurality of annotated images, and the user interface further enabling a user to adjust a respective color of one or more device status indicators in the respective image, thereby enabling utilization of training images representative of device status indicators in varied lighting environments, and giving rise to synthetic images improving training of the deep learning model for classification of device status indicators; and c) utilizing, at least, the plurality of annotated images, to train a deep learning model to classify an image to data indicative of at least one of:

a. one or more image identification labels, and b. one or more image subcomponent label tuples;

thereby enabling automated creation of a remote support service.

* * * * *